(12) United States Patent
Ingrisch et al.

(10) Patent No.: US 8,795,842 B2
(45) Date of Patent: Aug. 5, 2014

(54) FIBER-CONTAINING PASTY CONSTRUCTION MATERIALS

(75) Inventors: Stefan Ingrisch, Truchtlaching (DE); Thomas Bastelberger, Emmerting (DE); Jürgen Bezler, Burghausen (DE); Jakob Mühlthaler, Kirchdorf (DE)

(73) Assignee: Wacker Chemie AG, Munich (DE)

( * ) Notice: Subject to any disclaimer, the term of this patent is extended or adjusted under 35 U.S.C. 154(b) by 0 days.

(21) Appl. No.: 13/321,430

(22) PCT Filed: May 10, 2010

(86) PCT No.: PCT/EP2010/056357
§ 371 (c)(1),
(2), (4) Date: Nov. 18, 2011

(87) PCT Pub. No.: WO2010/133468
PCT Pub. Date: Nov. 25, 2010

(65) Prior Publication Data
US 2012/0071588 A1    Mar. 22, 2012

(30) Foreign Application Priority Data
May 18, 2009    (DE) .................. 10 2009 003 196

(51) Int. Cl.
*C08L 31/04*    (2006.01)
*C09D 133/06*   (2006.01)
*C04B 24/26*    (2006.01)

(52) U.S. Cl.
USPC ............................................. 428/500; 524/5

(58) Field of Classification Search
USPC ............................................. 524/5; 428/500
See application file for complete search history.

(56) References Cited

U.S. PATENT DOCUMENTS

| | | |
|---|---|---|
| 7,955,658 B2 | 6/2011 | Grasse et al. |
| 2008/0132624 A1 | 6/2008 | Fritze |
| 2008/0161500 A1 | 7/2008 | Stark et al. |
| 2009/0192242 A1* | 7/2009 | Willimann et al. ............ 524/5 |

FOREIGN PATENT DOCUMENTS

| | | |
|---|---|---|
| DE | 2516916 A1 | 10/1976 |
| DE | 2622465 A1 | 12/1977 |
| DE | 2703342 A1 | 8/1978 |
| DE | 3040077 A1 | 6/1982 |
| DE | 3429251 A1 | 2/1986 |
| DE | 4032769 A1 | 5/1991 |
| DE | 4216204 A1 | 11/1993 |
| DE | 4324315 A1 | 10/1994 |
| DE | 19624149 A1 | 1/1998 |
| DE | 19839295 A1 | 3/2000 |
| DE | 19903756 A1 | 8/2000 |
| DE | 19950441 A1 | 6/2001 |
| DE | 10248098 A1 | 5/2004 |
| DE | 102004048584 A1 | 4/2006 |
| DE | 102005023404 A1 | 12/2006 |
| DE | 102005053336 B4 | 5/2007 |
| DE | 102008043988 A1 | 5/2010 |
| EP | 0230220 A1 | 7/1987 |
| WO | 0177242 A2 | 10/2001 |
| WO | 2006058655 A1 | 6/2006 |
| WO | 2006099960 A1 | 9/2006 |
| WO | 2009156163 A1 | 12/2009 |

OTHER PUBLICATIONS

Fox T.G., Bull. Am. Physics Soc. 1, 3, p. 123 (1956).
Lee, W.A & Rutherford, R.A., Polymer Handbook 2nd Edition, J. Wiley & Sons, New York (1975).
Gattinger, Irene, International Search Report dated Sep. 9, 2010 for PCT Application No. EP2010/056357.
Gattinger, Irene, International Preliminary Report on Patentability dated Aug. 12, 2011, for PCT Application No. EP2010/056357 (Translation).

* cited by examiner

*Primary Examiner* — John Uselding
(74) *Attorney, Agent, or Firm* — RatnerPrestia

(57) ABSTRACT

The invention relates to fiber-containing pasty construction materials, containing a) one or more fillers, b) optionally additives, characterized in that they contain c) fibers, d) one or more polymers based on one or more ethylenically unsaturated monomers, having a glass transition temperature Tg of $\geq -15°$ C., e) $\leq 5\%$ by weight hydraulically setting binders and f) water, wherein the information in % by weight relates to the dry weight of the fiber-containing pasty construction materials. The invention also relates to a process for producing a reinforcing composition free of woven reinforcing fabrics.

11 Claims, No Drawings

FIBER-CONTAINING PASTY CONSTRUCTION MATERIALS

CROSS REFERENCE TO RELATED APPLICATIONS

This application is the national phase filing of international patent application No. PCT/EP2010/056357, filed 10 May 2010, and claims priority of German patent application number 10 2009 003 196.0, filed 18 May 2009, the entireties of which applications are incorporated herein by reference.

FIELD OF THE INVENTION

The invention relates to fiber-containing paste-like building compositions and their use, for example for building up composite thermal insulation systems which are free of woven reinforcing fabrics.

BACKGROUND OF THE INVENTION

To build up composite thermal insulation systems (CTIS), insulation boards, for example rigid foam boards or rock wool slabs, are usually fastened by means of an adhesive mortar to the masonry, a reinforcing layer into which woven reinforcing fabrics, usually woven fiberglass fabrics, are laid is subsequently applied to the insulation boards and the composite system is finally covered with a surface render. Thus, DE-A 2516916 or DE-A 4216204 describes the production of reinforcing layers by firstly applying polymer-modified building compositions containing from 8 to 17% by weight of hydraulically setting binders to insulation boards and subsequently embedding woven fiber fabrics, for example woven fiberglass fabrics or fiberglass meshes. Coatings which are free of woven reinforcing fabrics are not described. In DE-A 4216204, it is recommended that buildings be thermally insulated by providing them with mineral insulation boards and a cement-based layer of render containing from 15 to 28% by weight of hydraulically setting binders, with a woven fiber fabric being embedded between the thermal insulation boards and the layer of render. The layer of render can additionally contain fiber materials or polymers as adhesion promoters.

Thus, the application of woven fiber fabric-reinforced reinforcing layers to thermal insulation boards in principle requires a plurality of operations. In one step, the reinforcing composition is applied to the thermal insulation board, the woven reinforcing fabric is embedded in the reinforcing composition in a further step and the reinforcing composition is finally smoothed. The introduction of the woven reinforcing fabric into the applied reinforcing composition represents a step which not only costs working time but also material (woven reinforcing fabric). It would be simpler to process and less labor-intensive if a reinforcing layer which is free of woven reinforcing fabric were to have the same properties after curing as a conventional reinforcing layer consisting of reinforcing composition and additionally incorporated woven reinforcing fabric.

Some approaches to producing composite thermal insulation systems which are free of woven reinforcing fabric are already known. Thus, DE-A 10248098 describes composite thermal insulation systems comprising insulation boards and a fiberglass-reinforced, cement-based layer of render. DE-A 2622465 describes fiber-containing cement-based renders. The fiber-containing renders of DE-A 10248098 and of DE-A 2622465 are not modified with polymers based on ethylenically unsaturated monomers. The renders of DE-A 19624149, too, do not contain any polymers based on ethylenically unsaturated monomers. In DE-A 3429251, synthetic resin coating compositions containing crosslinked or crosslinkable polymers having glass transition temperatures Tg below −15° C. and optionally additional fibers are used for coating thermal insulation layers. The use of precrosslinked or crosslinkable polymers leads to brittle renders with the risk of crack formation. In DE-A 102004048584, exterior render preparations comprising carbon fibers and binders are recommended for producing composite thermal insulation systems reinforced with woven fiber fabrics. DE-A 19839295 relates to composite thermal insulation systems composed of lightweight mineral insulation boards which have been coated with a hydraulic lightweight render and are adhesively bonded to the lightweight render along the joints. The hydraulic lightweight render contains from 10 to 30% by weight, based on the dry composition, of hydraulically setting binders, polymer dispersions and cotton fibers. DE-A 4032769 recommends coating compositions comprising binders based on polymer dispersions or inorganic binders for composite thermal insulation systems. DE-A 3040077 discloses a rendering dry mortar for coating insulation boards, with the rendering dry mortar containing glass fibers, polymeric binders and at least 10% by weight, based on the dry composition, of hydraulically setting binders. DE-A 2703342 describes mortars containing polymers, fibers and from 15 to 40% by weight, based on the dry composition, of hydraulically setting binders for coating thermal insulation boards. DE-A 19950441 describes fiber-modified wall renders which contain copolymers based on acrylic esters and styrene and also ethylhydroxyethylcellulose as binders. DE-A 102008043988 recommends fiber-containing, polymer-modified dry mortar formulations which additionally contain from 10 to 30% by weight of hydraulically setting binders for producing composite thermal insulation systems.

Furthermore, DE-A 19624149 describes fiber-modified renders for décor purposes. DE-A 19903756 recommends décor renders containing organic polymers as binders and also fillers and polymer flocks as further components.

Despite the many approaches to the production of fiber-containing reinforcing layers, there is a need for building compositions in which the fibers are more compatible and interact more strongly with the further components of the reinforcing layers and, associated therewith, lead to composite thermal insulation systems having improved mechanical properties and a lower tendency for cracks to be formed.

In the light of this background, it was an object of the invention to provide fiber-containing paste-like building compositions with which the abovementioned disadvantages can be overcome.

SUMMARY OF THE INVENTION

The subject of the invention is fiber-containing paste-like building compositions containing a) one or more fillers, b) optionally additives, characterized in that c) fibers, d) one or more polymers based on one or more ethylenically unsaturated monomers and having a glass transition temperature Tg of ≥−15° C., e) ≤5% by weight of hydraulically setting binders and f) water are present, where the % by weight is based on the dry weight of the fiber-containing paste-like building compositions.

DETAILED DESCRIPTION OF THE INVENTION

Examples of suitable fillers a) are silica sand, quartz flour, calcium carbonate, dolomite, aluminum silicates, clay, chalk, white hydrated lime, talc or mica or else lightweight fillers such as pumice, foamed glass, gas concrete, perlite, vermiculite, carbon nanotubes (CNTs). It is also possible to use any mixtures of the fillers mentioned. Preference is given to silica sand, quartz flour, calcium carbonate, chalk or white hydrated lime. In general, the fiber-containing paste-like building compositions contain from 30 to 90% by weight, preferably from 40 to 80% by weight, of fillers, in each case based on the dry weight of the fiber-containing paste-like building compositions.

Customary additives b) for fiber-containing paste-like building compositions are thickeners, for example polysaccharides such as cellulose ethers and modified cellulose ethers, starch ethers, guar gum, xanthan gum, sheet silicates, polycarboxylic acids such as polyacrylic acid and partial esters thereof, and also polyvinyl alcohols which may optionally be acetalized or hydrophobically modified, casein and associatedly acting thickeners. Customary additives also include retarders such as hydroxycarboxylic acids or dicarboxylic acids or salts thereof, saccharides, oxalic acid, succinic acid, tartaric acid, gluconic acid, citric acid, sucrose, glucose, fructose, sorbitol, pentaerythritol. Customary additives include setting accelerators, for example alkali metal or alkaline earth metal salts of inorganic or organic acids. Further additives which may be mentioned are: hydrophobicizing agents, preservatives, film formers, dispersants, foam stabilizers, antifoams and flame retardants (e.g. aluminum hydroxide).

The additives b) are used in the customary amounts, which depend on the type of additive. In general, the amounts are from 0.1 to 10% by weight, in each case based on the dry weight of the fiber-containing paste-like building compositions.

Suitable fibers c) are, for example, natural or synthetic fibrous materials, based on either organic or inorganic materials, and mixtures thereof. Examples of natural, organic fibers are cotton, hemp, jute, flax, wood fibers, cellulose, viscose, leather fibers or sisal. Examples of synthetic, organic fibers are viscose fibers, polyamide fibers, polyester fibers, polyacrylonitrile fibers, Dralon fibers, polyethylene fibers, polypropylene fibers, polyvinyl alcohol fibers or aramid fibers. The inorganic fibers can be, for example, glass fibers, carbon fibers, mineral wool fibers or metal fibers. Preference is given to cotton fibers, polyacrylonitrile fibers and cellulose fibers.

The fibers used typically have a length in the range from 0.1 µm to 16 mm, preferably from 10 µm to 5 mm. However, it is also possible to use shorter or longer fibers. Particular preference is given to using fibers in a length range from 10 µm to 1 mm. The fibers can be used in the form of loose fibers, fibers adhesively bonded into bundles, fibrillated fibers, multifilament fibers or fibers in packaging for addition. It is an advantage of the invention that the fibers do not have to be used in the form of a woven fabric. Thus, the fibers preferably do not encompass woven fabrics, nonwovens or sheet-like materials. In general, the fiber-containing paste-like building compositions contain from 0.1 to 5% by weight, preferably from 0.5 to 2% by weight, of fibers, in each case based on the dry weight of the fiber-containing paste-like building compositions.

Hydraulically setting binders e) are, for example, cements, in particular Portland cement, high-alumina cement, trass cement, slag cement, magnesia cement, phosphate cement or blast furnace cement, and also mixed cements, filling cements, fly ash, microsilica, hydraulic lime and gypsum plaster. Preference is given to Portland cement, high-alumina cement and slag cement and also mixed cements, filling cements, hydraulic lime and gypsum plaster. In general, the fiber-containing paste-like building compositions contain ≤2% by weight and preferably ≤1% by weight of hydraulically setting binders, in each case based on the dry weight of the fiber-containing paste-like building compositions. The fiber-containing paste-like building compositions most preferably do not contain any hydraulically setting binders.

The fiber-containing paste-like building compositions preferably contain from 4 to 26% by weight, particularly preferably from 6 to 20% by weight and most preferably from 8 to 14% by weight, of water, in each case based on the dry mass of the fiber-containing paste-like building compositions.

To prepare the polymers d), it is possible to use one or more ethylenically unsaturated monomers selected from the group consisting of vinyl esters, (meth)acrylic esters, vinylaromatics, olefins, 1,3-diener and vinyl halides and optionally further monomers which are copolymerizable therewith. The polymers are preferably not crosslinked or crosslinkable.

Suitable vinyl esters are those of carboxylic acids having from 1 to 15 carbon atoms. Preference is given to vinyl acetate, vinyl propionate, vinyl butyrate, vinyl 2-ethylhexanoate, vinyl laurate, 1-methylvinyl acetate, vinyl pivalate and vinyl esters of α-branched monocarboxylic acids having from 9 to 11 carbon atoms, for example VeoVa9$^R$ or VeoVa10$^R$ (trade names of Resolution). Particular preference is given to vinyl acetate.

Suitable monomers from the group of acrylic esters or methacrylic esters are esters of unbranched or branched alcohols having from 1 to 15 carbon atoms. Preferred methacrylic esters or acrylic esters are methyl acrylate, methyl methacrylate, ethyl acrylate, ethyl methacrylate, propyl acrylate, propyl methacrylate, n-butyl acrylate, n-butyl methacrylate, t-butyl acrylate, t-butyl methacrylate, 2-ethylhexyl acrylate. Particular preference is given to methyl acrylate, methyl methacrylate, n-butyl acrylate, t-butyl acrylate and 2-ethylhexyl acrylate.

Preferred vinylaromatics are styrene, methylstyrene and vinyltoluene. A preferred vinyl halide is vinyl chloride. The preferred olefins are ethylene, propylene and the preferred dienes are 1,3-butadiene and isoprene.

From 0.1 to 5% by weight, based on the total weight of the monomer mixture, of auxiliary monomers can optionally also be copolymerized. Preference is given to using from 0.5 to 2.5% by weight of auxiliary monomers. Examples of auxiliary monomers are ethylenically unsaturated monocarboxylic and dicarboxylic acids, preferably acrylic acid, methacrylic acid, fumaric acid and maleic acid; ethylenically unsaturated carboxamides and carboxylic nitriles, preferably acrylamide and acrylonitrile; monoesters and diesters of fumaric acid and maleic acid, e.g. the diethyl and diisopropyl esters, and also maleic anhydride; ethylenically unsaturated sulfonic acids or salts thereof, preferably vinylsulfonic acid, 2-acrylamido-2-methylpropanesulfonic acid. Further examples are crosslinking comonomers such as multiply ethylenically unsaturated comonomers, for example diallyl phthalate, divinyl adipate, diallyl maleate, allyl methacrylate or triallyl cyanurate, or post-crosslinking comonomers, for example acrylamidoglycolic acid (AGA), methyl methylacrylamidoglycolate (MMAG), N-methylolacrylamide (NMA), N-methylolmethacrylamide, allyl N-methylolcarbamate, alkyl ethers such as the isobutoxy ether or ester of N-methylolacrylamide, of N-methylolmethacrylamide and of allyl N-methylolcarbamate. Crosslinking monomers also include epoxide-functional comonomers such as glycidyl methacrylate and glycidyl acrylate. Further examples of crosslinking monomers are silicon-functional comonomers such as acryloxypropyltri(alkoxy)silanes and methacryloxypropyltri(alkoxy)silanes, vinyltrialkoxysilanes and vinylmethyldialkoxysilanes, with, for example, ethoxy and ethoxypropylene glycol ether radicals being able to be present as alkoxy groups. Mention may also be made of monomers having hydroxy or CO groups, for example hydroxyalkyl methacrylates and acrylates such as hydroxyethyl, hydroxypropyl or hydroxybutyl acrylate or methacrylate and also compounds such as diacetone-acrylamide and acetylacetoxyethyl acrylate or methacrylate. The polymers d) preferably contain ≤1% by weight of units of crosslinking monomers, based on the total mass of the polymers d), and the polymers d) particularly preferably do not contain any crosslinking groups.

The polymers d) preferably have glass transition temperatures Tg of ≥−13° C., particularly preferably from −10 to +50° C., very particularly preferably from −10 to +35° C. and most preferably from −7 to +20° C.

The selection of monomers and the selection of the proportions by weight of the comonomers is carried out so that the abovementioned glass transition temperatures result. The glass transition temperature Tg of the polymers can be determined in a known way by means of differential scanning calorimetry (DSC). The Tg can also be calculated approximately beforehand by means of the Fox equation. According to Fox T. G., Bull. Am. Physics Soc. 1, 3, page 123 (1956): $1/Tg = x_1/Tg_1 + x_2/Tg_2 + \ldots + x_n/Tg_n$, where $x_n$ is the mass fraction (% by weight/100) of the monomer n and $Tg_n$ is the glass transition temperature in kelvin of the homopolymer of the monomer n. Tg values for homopolymers are given in Polymer Handbook $2^{nd}$ Edition, J. Wiley & Sons, New York (1975).

Preference is given to copolymers of one or more vinyl esters with from 1 to 50% by weight of ethylene; copolymers of vinyl acetate with from 1 to 50% by weight of ethylene and from 1 to 50% by weight of one or more further comonomers selected from the group consisting of vinyl esters having from 1 to 12 carbon atoms in the carboxylic acid radical, e.g. vinyl propionate, vinyl laurate, vinyl esters of α-branched carboxylic acids having from 9 to 13 carbon atoms, e.g. VeoVa9, VeoVa10, VeoVa11; copolymers of one or more vinyl esters, from 1 to 50% by weight of ethylene and preferably from 1 to 60% by weight of (meth)acrylic esters of unbranched or branched alcohols having from 1 to 15 carbon atoms, in particular n-butyl acrylate or 2-ethylhexyl acrylate; and copolymers comprising from 30 to 75% by weight of vinyl acetate, from 1 to 30% by weight of vinyl laurate or vinyl esters of an α-branched carboxylic acid having from 9 to 11 carbon atoms and also from 1 to 30% by weight of (meth)acrylic esters of unbranched or branched alcohols having from 1 to 15 carbon atoms, in particular n-butyl acrylate or 2-ethylhexyl acrylate, which additionally contain from 1 to 40% by weight of ethylene; copolymers comprising one or more vinyl esters, from 1 to 50% by weight of ethylene and from 1 to 60% by weight of vinyl chloride; where the polymers can additionally contain the abovementioned auxiliary monomers in the amounts mentioned and the percentages by weight in each case add up to 100% by weight.

Preference is also given to (meth)acrylic ester polymers such as copolymers of n-butyl acrylate or 2-ethylhexyl acrylate or copolymers of methyl methacrylate with n-butyl acrylate and/or 2-ethylhexyl acrylate; styrene-acrylic ester copolymers with one or more monomers selected from the group consisting of methyl acrylate, ethyl acrylate, propyl acrylate, n-butyl acrylate, 2-ethylhexyl acrylate; vinyl acetate-acrylic ester copolymers with one or more monomers selected from the group consisting of methyl acrylate, ethyl acrylate, propyl acrylate, n-butyl acrylate, 2-ethylhexyl acrylate and optionally ethylene; styrene-1,3-butadiene copolymers; where the polymers can additionally contain the abovementioned auxiliary monomers in the amounts mentioned and the percentages by weight in each case add up to 100% by weight.

Most preferred polymers d) are copolymers containing vinyl acetate and from 5 to 50% by weight of ethylene and copolymers comprising vinyl acetate, from 1 to 50% by weight of ethylene and from 1 to 50% by weight of a vinyl ester of α-branched monocarboxylic acids having from 9 to 11 carbon atoms, or copolymers comprising from 30 to 75% by weight of vinyl acetate, from 1 to 30% by weight of vinyl laurate or vinyl esters of an α-branched carboxylic acid having from 9 to 11 carbon atoms and also from 1 to 30% by weight of (meth)acrylic esters of unbranched or branched alcohols having from 1 to 15 carbon atoms, which additionally contain from 1 to 40% by weight of ethylene, or copolymers comprising vinyl acetate, from 5 to 50% by weight of ethylene and from 1 to 60% by weight of vinyl chloride.

The preparation of the polymers d) is generally carried out in an aqueous medium and preferably by the emulsion or suspension polymerization process, as described, for example, in DE-A 102008043988. The polymers are obtained in the form of aqueous dispersions. The polymerization can be carried out using the customary protective colloids and/or emulsifiers as are described in DE-A 102008043988. Preference is given to using partially hydrolyzed or fully hydrolyzed polyvinyl alcohols having a degree of hydrolysis of from 80 to 100 mol %, in particular partially hydrolyzed polyvinyl alcohols having a degree of hydrolysis of from 80 to 94 mol % and a Höppler viscosity in 4% strength aqueous solution of from 1 to 30 mPas (Höppler method at 20° C., DIN 53015), as protective colloids. The protective colloids mentioned can be obtained by methods known to those skilled in the art and are generally added in a total amount of from 1 to 20% by weight, based on the total weight of the monomers, in the polymerization.

The polymers d) in the form of aqueous dispersions can, as described in DE-A 102008043988, be converted into corresponding water-redispersible powders. In general, a drying aid is used here in a total amount of from 3 to 30% by weight, preferably from 5 to 20% by weight, based on the polymeric constituents of the dispersion. The abovementioned polyvinyl alcohols are preferred as drying aid.

The fiber-containing paste-like building compositions preferably contain from 2 to 25% by weight, particularly preferably from 4 to 17% by weight and most preferably from 6 to 10% by weight, of polymers d), in each case based on the dry mass of the fiber-containing paste-like building compositions.

The preparation of the fiber-containing paste-like building compositions is generally carried out by mixing and homogenizing the components a) to f) in conventional mixing apparatuses. It is also possible firstly to mix individual components or all components a) to e) separately with water f) to give a building composition. The polymers d) can be used in the form of water-redispersible powders, as aqueous redispersions of water-redispersible powders or preferably in the form of aqueous dispersions. The order of addition of the individual components is immaterial.

The fiber-containing paste-like building compositions can be applied by means of manual or machine processes with which those skilled in the art are familiar. The fiber-containing paste-like building compositions are particularly suitable as reinforcing compositions for composite thermal insulation systems which do not contain any woven fiber fabrics. To produce the reinforcing layer, the fiber-containing paste-like building compositions are applied to the insulation materials, in particular insulation boards. Customary insulation materials are EPS (expanded polystyrene), XPS (=extruded polystyrene), polyurethane, rigid resol resin foam, mineral wool, hemp, reed, wood fibers.

Further uses of the fiber-containing paste-like building compositions are in adhesives and coating compositions. Examples of adhesives are adhesives for thermal insulation boards and acoustic insulation boards, tile adhesives and adhesives for adhesively bonding wood and wood materials. Examples of coating compositions are mortars, self-leveling compositions, screeds, renders.

The use according to the invention of the polymers d) in the fiber-containing paste-like building compositions finally leads to products having advantageous use properties, for example the desired adhesive bond between the individual constituents of a composite thermal insulation system or improved mechanical properties of the reinforcing layers, in particular an improved impact strength. This can be attributed to the advantageous interaction and compatibility of the polymers used according to the invention with the fibers c) and also the further components of the building compositions. A further consequence of this advantageous interaction and compatibility is the good processability of the fiber-containing paste-like building compositions.

The procedure according to the invention gives, even without use of woven fiber fabrics, composite thermal insulation systems which have the same properties as comparable systems comprising woven fiber fabrics. The omission of woven fiber fabrics enables the outlay for laying these and material costs to be saved. However, the additional use of woven fiber fabrics to increase the mechanical properties of the composite thermal insulation systems further is naturally also possible. In addition, the fiber-containing paste-like building compositions of the invention are ready to use and can be processed directly on the building site without further components having to be added. This is particularly advantageous in applications in painting and decorating since the mixing of building compositions there is a disadvantage because of the time outlay associated therewith. However, as an alternative, the fiber-containing paste-like building compositions of the invention can be mixed with further components such as hydraulically setting binders before use. The abovementioned binders e) are particularly useful for this purpose, preferably in amounts of from 5 to 30% by weight, particularly preferably from 10 to 20% by weight, based on the dry mass of the fiber-containing paste-like building composition. Additional water can optionally be added.

The following examples serve to illustrate the invention:

In (comparative) examples 1 to 10, the following polymer dispersions were used:

Dispersion 1:
Emulsifier-stabilized, aqueous dispersion of a vinyl laurate-ethylene-vinyl chloride terpolymer having a glass transition temperature Tg of +14° C. and a solids content SC of 60% by weight.

Dispersion 2:
Emulsifier-stabilized, aqueous dispersion of a vinyl acetate-ethylene copolymer having a glass transition temperature Tg of +9° C. and a solids content SC of 60% by weight.

Dispersion 3 (comparative dispersion):
Emulsifier-stabilized, aqueous dispersion based on an acrylate copolymer having a glass transition temperature Tg of −22° C. and a solids content SC of 50% by weight.

To produce the paste-like building compositions of the examples (Ex.) and comparative examples (CEx.) 1 to 6 and also 9 and 10, the respective constituents indicated in table 1 or table 2 under component 1 were mixed as follows in the amounts indicated there:

Water was firstly placed in a mixing vessel, the liquid components were then added, the fibers were subsequently mixed in, the polymer dispersion was then added and the fillers and the remaining constituents were finally mixed in.

In example 7 and comparative example 8, the building compositions were two-component systems containing cement as a further constituent. The compositions were produced in a manner analogous to the abovementioned (comparative) examples except that the amount of additional water and cement indicated as component two was stirred in immediately before application of the fiber-containing paste-like building composition.

Comparative example 8 was a conventional paste-like two-component building composition containing cement but no fibers, with a woven fiberglass fabric being additionally embedded.

To produce the reinforcing layer, the respective building composition was applied to EPS (expanded polystyrene) boards.

The properties of the paste-like building compositions were assessed in respect of mechanical stability, malleability and air pore formation and assigned school grades (very good, good, satisfactory, unsatisfactory) relative to the conventional building composition of comparative example 8.

To produce the reinforcing layers, the paste-like building compositions of (comparative) examples 1 to 10 were each applied in a layer thickness of 4 mm to EPS (expanded polystyrene) boards. In the case of comparative example 8, woven fiberglass fabric was additionally laid into the reinforcing layer.

After curing of the reinforcing layer for 28 days under standard conditions of temperature and humidity in accordance with DIN EN 13494, the adhesive pull strength and the pull-out on EPS boards were determined in accordance with test method DIN 18555-6. The denting value on EPS was determined in accordance with test method ISO 7892. The results of testing are summarized in table 3 and table 4.

The results show that the fiber-containing paste-like building compositions according to the invention (examples 1 to 7 and 9) can be processed like conventional fiber-free building compositions (comparative example 8). No deterioration in mechanical stability, malleability and air pore formation was found.

The adhesion to the thermal insulation board was improved compared to the conventional fiber-free building compositions (tables 3 and 4: adhesive pull strengths and EPS pull-out of comparative example 8 and of examples 1 to 7 and example 9).

It was surprising that the denting values for the reinforcing render according to the invention are partly (examples 1 to 4) better than the value for a cement-based standard reinforcing render reinforced with woven fiberglass fabric (comparative example 8). The unexpected influence of the glass transition temperatures Tg of the polymers on the mechanical properties of the reinforcing renders can be seen from a comparison of comparative example 10 with the examples according to the invention.

TABLE 1

| Formulation (figures in parts by weight) | Ex. 1 | Ex. 2 | Ex. 3 | Ex. 4 | Ex. 5 |
|---|---|---|---|---|---|
| Component 1: | | | | | |
| Methylhydroxyethylcellulose | 77.2 | 78.8 | 78.8 | 79.7 | 78.2 |
| Dispersion 1 | 139.0 | 141.8 | | | 140.7 |
| Dispersion 2 | | | 141.8 | 143.5 | |
| Magnesium sheet silicate | 15.4 | | 15.8 | | 15.6 |
| Aluminum hydroxide | 69.5 | 70.9 | 70.9 | 71.7 | 50.0 |
| Calcium carbonate | | | | | |
| Ground limestone (2-25 μm)[1] | | | | | 121.1 |
| Ground limestone (20-200 μm)[1] | 270.4 | 275.7 | 267.8 | 271.0 | 199.3 |
| Cotton fibers (0.5 mm)[2] | 3.5 | 3.5 | 5.5 | 5.6 | 3.5 |
| Dralon fibers (1 mm)[2] | 5.4 | 5.5 | 3.5 | 3.6 | 5.5 |
| Cellulose fibers (40 μm)[2] | 4.2 | 4.3 | 4.3 | 4.4 | 4.3 |
| Limestone | 355.4 | 362.3 | | | |
| Silica sand (0.08-0.2 mm)[1] | | | | | |
| Silica sand (0.1-0.5 mm)[1] | | | | | 340.8 |
| Silica sand (0.05-0.25 mm)[1] | | | 157.5 | 159.4 | |
| Silica sand (0.2-0.6 mm)[1] | | | 141.8 | 143.5 | |
| Silica sand (0.3-0.7 mm)[1] | | | 78.8 | 79.7 | |
| Preservative | 0.8 | 0.8 | 0.8 | 0.8 | 0.8 |
| Antifoam | 0.8 | 0.8 | 0.8 | 0.8 | 0.8 |
| Ammonia solution (25% strength in water) | 0.4 | 0.4 | 0.4 | 0.4 | 0.4 |
| Water | 57.9 | 55.1 | 31.5 | 35.9 | 39.1 |
| Component 2: | | | | | |
| White cement CEM I 42, 5 sw | | | | | |
| Water | | | | | |
| Total (components 1 and 2): | 1000 | 1000 | 1000 | 1000 | 1000 |
| Woven fiberglass fabric | no | no | no | no | no |

TABLE 2

| Formulation (figures in parts by weight) | Ex. 6 | Ex. 7 | CEx. 8 | Ex. 9 | CEx. 10 |
|---|---|---|---|---|---|
| Component 1: | | | | | |
| Methylhydroxyethylcellulose | 77.2 | 64.1 | 1.1 | 76.1 | 78.8 |
| Dispersion 1 | | 115.3 | 125.5 | 137.0 | |
| Dispersion 2 | 139.0 | | | | |
| Dispersion 3 | | | | | 171.5 |
| Magnesium sheet silicate | 15.4 | 12.8 | | 15.2 | |
| Aluminum hydroxide | 69.5 | 57.6 | | 68.5 | 68.2 |
| Microsilica | | | 38.0 | | |
| Calcium carbonate | | | 200.8 | | |
| Ground limestone (2-25 μm)[1] | | | | | |
| Ground limestone (20-200 μm)[1] | 262.6 | 217.8 | | 258.6 | 272.7 |
| Cotton fibers (0.5 mm)[2] | 3.5 | 4.5 | | 5.3 | 3.5 |
| Dralon fibers (1 mm)[2] | 5.4 | 2.9 | | 3.4 | 5.4 |
| Cellulose fibers (40 μm)[2] | 4.2 | 3.5 | | 4.2 | 4.3 |
| Limestone | | | | | 362.4 |
| Silica sand (0.08-0.2 mm)[1] | 370.8 | | | | |
| Silica sand (0.1-0.5 mm)[1] | | | 376.5 | | |
| Silica sand (0.05-0.25 mm)[1] | | 128.1 | | 129.3 | |
| Silica sand (0.2-0.6 mm)[1] | | 115.3 | | 121.7 | |
| Silica sand (0.3-0.7 mm)[1] | | 64.1 | | 76.1 | |
| Preservative | 0.8 | 0.7 | 1.3 | 0.8 | 0.8 |
| Antifoam | 0.8 | 0.7 | 1.7 | 0.8 | 0.8 |
| Ammonia solution (25% strength in water) | 0.4 | 0.3 | 0.4 | 0.4 | 0.4 |
| Water | 50.2 | 32.0 | 83.7 | 64.7 | 31.3 |
| Component 2: | | | | | |
| White cement CEM I 42, 5 sw | | | 123.0 | 209 | |
| Water | | | 57.4 | | |
| Total (components 1 and 2): | 1000 | 1000 | 1000 | 1000 | 1000 |
| Woven fiberglass fabric | no | no | yes | no | no |

TABLE 3

| Results of testing: | | | | | |
|---|---|---|---|---|---|
| | Ex. 1 | Ex. 2 | Ex. 3 | Ex. 4 | Ex. 5 |
| Woven fiberglass fabric | no | no | no | no | no |
| Adhesive pull strength [N/mm²] | 0.12 | 0.11 | 0.12 | 0.11 | 0.11 |
| EPS pull-out in % | 90 | 85 | 90 | 85 | 85 |
| Denting value [J] | 5 | 5 | 5 | 5 | 3 |
| Mechanical stability | good | good | good | good | good |
| Malleability | good | good | good | good | good |
| Air pores | good | good | good | good | good |

TABLE 4

| Results of testing: | | | | | |
|---|---|---|---|---|---|
| | Ex. 6 | Ex. 7 | CEx. 8 | Ex. 9 | CEx. 10 |
| Woven fiberglass fabric | no | no | yes | no | no |
| Adhesive pull strength [N/mm²] | 0.12 | 0.11 | 0.10 | 0.12 | 0.07 |
| EPS pull-out in % | 90 | 85 | 75 | 90 | 65 |
| Denting value [J] | 4 | 3 | 3 | 5 | 2 |
| Mechanical stability | good | good | good | good | good |
| Malleability | good | good | good | good | good |
| Air pores | good | good | good | good | good |

The invention claimed is:

1. A fiber-containing paste-like building composition containing a) 40% to 80% by weight of one or more fillers, b) optionally 0.1% to 10% by weight of further additives, characterized in that c) 0.1% to 5% by weight of fibers, d) 4% to 17% by weight of one or more polymers based on one or more ethylenically unsaturated monomers and having a glass transition temperature Tg of ≥−15° C., e) ≤5% by weight of hydraulically setting binders and f) 4% to 26% by weight of water are present, where the % by weight is based on the dry weight of the fiber-containing paste-like building composition, and the polymers d) are selected from the group consisting of copolymers of one or more vinyl esters with from 1 to 50% by weight of ethylene; copolymers of vinyl acetate with from 1 to 50% by weight of ethylene and from 1 to 50% by weight of one or more further comonomers selected from the group consisting of vinyl esters having from 1 to 12 carbon atoms in the carboxylic acid radical; copolymers comprising from 30 to 75% by weight of vinyl acetate, from 1 to 30% by weight of vinyl laurate or vinyl esters of an α-branched carboxylic acid having from 9 to 11 carbon atoms and also from 1 to 30% by weight of (meth)acrylic esters of unbranched or branched alcohols having from 1 to 15 carbon atoms, which additionally contain from 1 to 40% by weight of ethylene; and copolymers comprising one or more vinyl esters, from 1 to 50% by weight of ethylene and from 1 to 60% by weight of vinyl chloride; wherein the figures in % by weight for the respective copolymer add up to 100% by weight, wherein 6% to 10% by weight of the one or more polymers d) are present.

2. The fiber-containing paste-like building composition as claimed in claim 1, wherein the fibers c) are organic and/or inorganic fibers.

3. The fiber-containing paste-like building composition as claimed in claim 1, wherein the one or more polymers d) have glass transition temperatures Tg of from −13 to +50° C.

4. A process for producing a reinforcing composition free of woven reinforcing fabrics, comprising a step of applying the fiber-containing paste-like building composition as claimed in claim 1 to an insulation board.

5. The process as claimed in claim 4, wherein the insulation board is based on EPS (expanded polystyrene), XPS (extruded polystyrene), polyurethane, rigid resol resin foam, mineral wool, hemp, reed or wood fibers.

6. The process as claimed in claim 4, wherein a composite thermal insulation system that does not contain any woven fiber fabric is produced.

7. An adhesive or coating composition comprising the fiber-containing paste-like building composition as claimed in claim 1.

8. An adhesive for thermal insulation boards, acoustic insulation boards, or tile, or for adhesively bonding wood or wood materials, comprising the fiber-containing paste-like building composition as claimed in claim 1.

9. A mortar, self-leveling composition, screed or render comprising the fiber-containing paste-like building composition as claimed in claim 1.

10. A fiber-containing past-like building composition containing a) 40% to 80% by weight of one of more filler, b) optionally 0.1% to 10% by weight of further additives, characterized in that c) 0.1% to 5% by weight of fibers, d) 4% to 17% by weight of one or more polymers based on one or more ethylenically unsaturated monomers and having a glass transition temperature Tg of ≥−15° C., e) ≤5% by weight of hydraulically setting binders and f) 4% to 26% by weight of water are present, where the % by weight is based on the dry weight of the fiber-containing paste-like building composition, and the polymers d) are selected from the group consisting of copolymers of one or more vinyl esters with from 1 to 50% by weight of ethylene; copolymers of vinyl acetate with from 1 to 50% by weight of ethylene and from 1 to 50% by weight of one or more further comonomers selected from the group consisting of vinyl esters having from 1 to 12 carbon atoms in the carboxylic add radical; copolymers comprising from 30 to 75% by weight of vinyl acetate, from 1 to 50% weight of vinyl laurate or vinyl esters of an α-branched carboxylic acid having from 9 to 11 carbon atoms and also from 1 to 30% by weight of (meth)acrylic esters of unbranched or branched alcohols having from 1 to 15 carbon atoms, which additionally contain from 1 to 40% by weight of ethylene and copolymers comprising one or more vinyl esters, from 1 to 50% by weight of ethylene and from 1 to weight of vinyl chloride; wherein the figures in % by weight for the respective copolymer add up to 100% by weight, wherein only one polymer based on one or more ethylenically unsaturated monomers is present in the composition.

11. The fiber-containing paste-like building composition as claimed in claim 1, wherein the one or more polymers have a glass transition temperature Tg in a range from −7° C. to +20° C.

* * * * *

UNITED STATES PATENT AND TRADEMARK OFFICE
CERTIFICATE OF CORRECTION

PATENT NO. : 8,795,842 B2
APPLICATION NO. : 13/321430
DATED : August 5, 2014
INVENTOR(S) : Ingrisch et al.

It is certified that error appears in the above-identified patent and that said Letters Patent is hereby corrected as shown below:

In the Claims

Column 11, line 23, claim 10, "a) 40% to 80% by weight of one of more filler," should be --a) 40% to 80% by weight of one or more fillers,--

Column 12, line 10, claim 10, "from 1 to 12 carbon atoms in the carboxylic add radical;" should be --from 1 to 12 carbon atoms in the carboxylic acid radical;--

Column 12, lines 19-20, claim 10, "and from 1 to weight of vinyl chloride;" should be --and from 1 to 60% by weight of vinyl chloride;--

Signed and Sealed this
Twenty-first Day of October, 2014

Michelle K. Lee
*Deputy Director of the United States Patent and Trademark Office*